(12) United States Patent
Jordan

(10) Patent No.: US 10,194,639 B2
(45) Date of Patent: Feb. 5, 2019

(54) TRAINING DEVICE FOR WATER CONSERVATION SYSTEM

(76) Inventor: B. Delano Jordan, Silver Spring, MD (US)

( * ) Notice: Subject to any disclaimer, the term of this patent is extended or adjusted under 35 U.S.C. 154(b) by 1293 days.

(21) Appl. No.: 12/714,603

(22) Filed: Mar. 1, 2010

(65) Prior Publication Data

US 2010/0218733 A1    Sep. 2, 2010

Related U.S. Application Data

(60) Provisional application No. 61/156,778, filed on Mar. 2, 2009.

(51) Int. Cl.
*A01K 15/02* (2006.01)

(52) U.S. Cl.
CPC .................................... *A01K 15/02* (2013.01)

(58) Field of Classification Search
CPC ....... A01K 15/00; A01K 15/02; A01K 15/021
USPC ................. 119/712, 719–721, 161, 163, 165
See application file for complete search history.

(56) References Cited

U.S. PATENT DOCUMENTS

| 6,104,294 A * | 8/2000 | Andersson | A01K 11/006 119/712 |
| 7,203,576 B1 * | 4/2007 | Wilson et al. | 700/284 |
| 7,409,924 B2 * | 8/2008 | Kates | 119/720 |
| 2003/0154930 A1 * | 8/2003 | Maddox et al. | 119/720 |
| 2008/0196671 A1 * | 8/2008 | Dukes et al. | 119/163 |
| 2009/0064940 A1 * | 3/2009 | Cressy | 119/163 |
| 2009/0205582 A1 * | 8/2009 | Kitchens | 119/719 |
| 2009/0241853 A1 * | 10/2009 | Boyd | 119/712 |
| 2010/0122662 A1 * | 5/2010 | Kennington | 119/165 |
| 2012/0006282 A1 * | 1/2012 | Kates | 119/720 |

FOREIGN PATENT DOCUMENTS

| JP | 2006-042670 A | 2/2006 |
| JP | 2008-009641 A | 1/2008 |
| JP | 2008-125418 A | 6/2008 |
| KR | 10-2006-0132381 A | 12/2006 |
| WO | 2005-101273 A1 | 10/2005 |

OTHER PUBLICATIONS

Korean Intellectual Property Office, International Search Report and Written Opinion, dated Sep. 30, 2010.

* cited by examiner

*Primary Examiner* — Son T Nguyen
(74) *Attorney, Agent, or Firm* — Jordan IP Law, LLC

(57) ABSTRACT

In one embodiment, a training device may include a first module to receive a plurality of inputs that define a set of animal waste elimination behaviors. A second module may train an animal monitoring system based on the plurality of inputs. The training may facilitate use of the animal monitoring system with an irrigation system to reduce water consumption.

16 Claims, 10 Drawing Sheets

Welcome to the Benivoli Water Conservation System

Please select a mode:

☐ Training

☐ Operation

Training Mode

Please enter the name of your pet or select from the list below:

☐ Maxine

☐ Enter new pet

68

```
Training Mode for Charlie

You may either have the system
learn Charlie's behavior, or you may
enter the information directly:

☐ Learn

☐ Enter
```

70

```
Behavior Learning

The first task is to determine how
long it usually takes for Charlie to
"go" after being let outside. Please
select the "Grass entry" button when
you let Charlie outside:

☐ Grass entry
```

Behavior Learning

Then, select the "Start" button when Charlie begins to urinate or defecate. Next, observe Charlie's movement, and indicate on the slider how much Charlie moves. Finally, select the "Stop" button when Charlie is done.

☑ Grass entry ← — 71

☐ Start ← — 73

Movement (low — high)

☐ Stop ← — 75

Behavior Learning

Move the sliders to indicate the desired monitoring period, idleness period and idleness threshold: — 77

Monitoring period (short — long)

Idleness period (short — long)

Idleness threshold (low — high)

TRAINING DEVICE FOR WATER CONSERVATION SYSTEM

CROSS-REFERENCE TO RELATED APPLICATIONS

This application claims the benefit of priority to U.S. Provisional Application No. 61/156,778, filed on Mar. 2, 2009, and is related to U.S. application Ser. No. 12/271,895, filed on Nov. 15, 2008, which claims the benefit of priority to U.S. Provisional Application No. 60/988,431, filed on Nov. 16, 2007.

BACKGROUND

Technical Field

Embodiments of the invention generally relate to water conservation-friendly irrigation systems. More particularly, embodiments of the invention relate to devices that train irrigation systems based on the behaviors of animals.

Discussion

Concerns over climate change and economic stability have placed a heightened focus on environmental issues such as renewable energy and water conservation. For example, the WaterSense® program of the U.S. Environmental Protection Agency (EPA) establishes indoor and outdoor water efficiency criteria for single-family new homes, in an effort to reduce water usage and encourage community infrastructure savings. The outdoor water efficiency criteria provide guidelines for the design of irrigation systems and require that irrigation controllers have variable scheduling capability and be able to accept external data from soil moisture and/or rain sensors. While the use of adjustable controllers and soil moisture and rain sensors may be a step in the right direction, there still remains considerable room for improvement.

For example, pet activity, such as urination or defecation, in grassy areas may result in localized areas of high nitrogen concentration. When sunlight interacts with these areas of high nitrogen concentration, unsightly "burn spots" may occur. While irrigation controller schedules might be adjusted to generally provide for increased water delivery to animal-accessible grassy areas in an effort to dilute the nitrogen, such a solution may counteract the aforementioned efforts to conserve water, particularly if the location of the areas of high nitrogen concentration are not known. Moreover, the behaviors of pets may vary with regard to waste elimination (e.g., urination or defecation), which could impede efforts to determine the location of areas of high nitrogen concentration.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 4A-4F are screen shots of examples of user interface prompts according to an embodiment of the present invention;

DETAILED DESCRIPTION

Embodiments of the present invention provide for a device having a first module and a second module. The first module may receive a plurality of inputs that define a set of animal waste elimination behaviors, and the second module may train an animal monitoring system based on the plurality of inputs.

Embodiments of the present invention also provide for a machine readable medium including an application stored thereon that, if executed, causes a wireless device to receive a plurality of inputs that define a set of animal waste elimination behaviors and train an animal monitoring system based on the plurality of inputs.

Embodiments of the present invention also provide for a monitoring system having a memory, a communication module and a training module. The communication module can receive training data from a remote device and the training module may store a monitoring period and an idleness period to the memory based on the training data. The monitoring period can define a period of time to monitor an animal for an onset of an elimination event and the idleness period can define a period of time for the elimination event.

Figure 1:
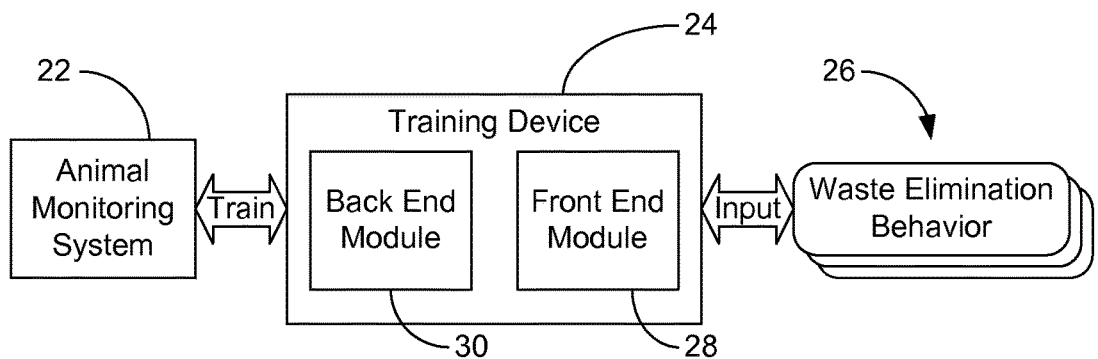
FIG. 1 is a block diagram of an example of a training scheme according to an embodiment of the present invention.

FIG. 1 shows a scheme 20 for training an animal monitoring system 22 in which a training device 24 receives a plurality of inputs that define a set of animal waste elimination behaviors 26. As will be discussed in greater detail, the inputs may be received from a user via a user interface, from one or more sensors, from the Internet, or from any other suitable source. The waste elimination behaviors 26 may characterize the manner in which an animal engages in activity that could result in localized areas of high nitrogen concentration. For example, the inputs may include, but are not limited to, posture inputs and waste elimination timing inputs such as an indication of when the animal enters a grassy area, how long it takes the animal to begin to urinate or defecate and how long it takes the animal to complete urination or defecation. Knowledge of the animal waste elimination behaviors 26 can be useful to the monitoring system 22, which can facilitate significant conservation of water by an irrigation system (not shown) that services the grassy area accessible by the animal. The training device 24 may also train the monitoring system 22 based on other information, such as animal type, breed, weight, and name.

Accordingly, the illustrated training device 24 includes a front end module 28 to receive the plurality of inputs and a back end module 30 to train the animal monitoring system 22 based on the plurality of inputs. The front end module 28 and back end module 30 may be integrated into a single module. The animal monitoring system 22 could be an animal mounted device such as a monitoring device coupled to a collar, harness or bracelet, or a non-animal mounted device such as a perimeter based monitoring system.

Figure 2:
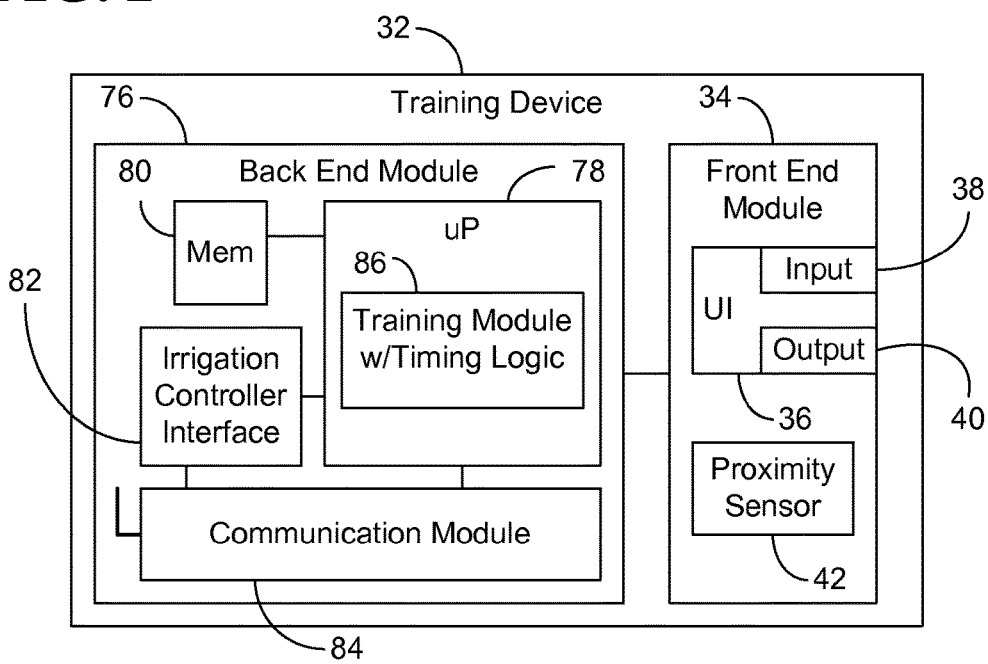
FIG. 2 is a block diagram of an example of a training device according to an embodiment of the present invention.

Turning now to FIG. 2, one example of a training device 32 is shown in greater detail. The training device 32 may be readily substituted for the training device 24 (FIG. 1), already discussed. The illustrated training device 32 includes a front end module 34 with a user interface 36 having one or more input components 38 and one or more output components 40. The user interface 36 may be implemented in executable software as a set of logic instructions stored in a machine- or computer-readable medium of a memory such as random access memory (RAM), read only memory (ROM), programmable ROM (PROM), flash memory, etc., in fixed-functionality hardware using circuit technology such as application specific integrated circuit (ASIC), complementary metal oxide semiconductor (CMOS) or transistor-transistor logic (TTL) technology, or any combination thereof. Indeed, the input components 38 could include a button, keypad, touch-screen, microphone, etc., or any variation thereof.

The illustrated output components 40 are able to provide information to the user and may include a liquid crystal display (LCD), light emitting diode (LED), speaker, or any other appropriate output component 40. The front end module 34 may also include a sensor such as a proximity sensor 42 to detect activities such as the animal passing through a doorway or a pet door into the grassy area. In this regard, the training device 32 may be mounted near the doorway in a permanent or detachable fashion. The proximity sensor 42 could therefore be an RFID reader/tag capable of detecting the presence of an RFID tag/reader (not shown) disposed within the monitoring system. Alternatively, the proximity sensor 42 could include one or more infrared transceivers mounted to the doorway frame and one or more reflectors mounted opposite the transceivers so that passage of the animal may trigger one or more of the transceivers. Other variations of the proximity sensor 42 can also be used. The training device 32 may also include a direct current (DC) power source (not shown), that could be rechargeable via a cradle or other charging component.

Figures 3A, 3B, 3C:
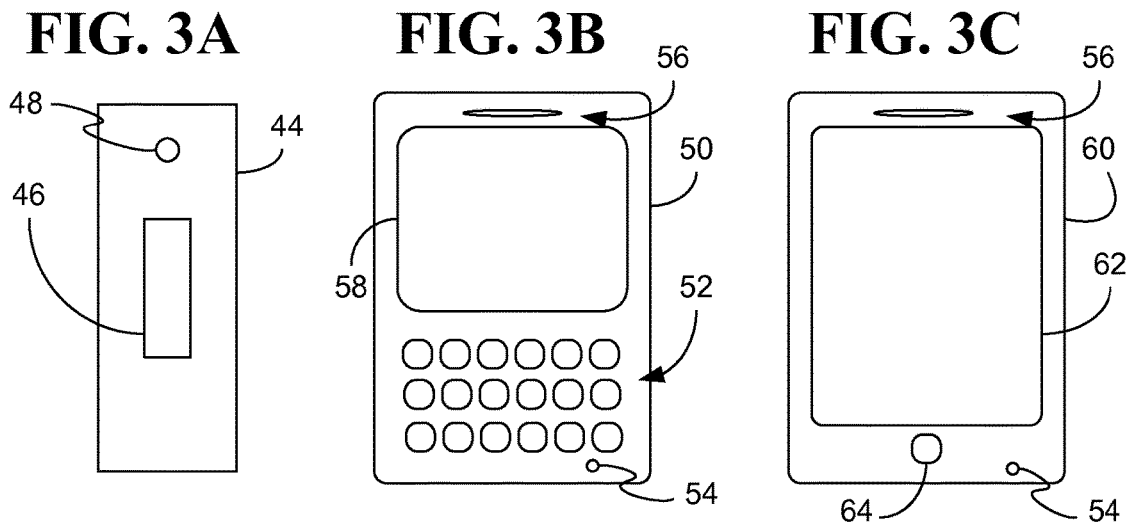
FIGS. 3A-3C are illustrations of examples of training device exteriors according to embodiments of the present invention.

FIGS. 3A-3C demonstrate that the training device may be structured in many different ways. For example, FIG. 3A shows a training device 44 with an electromechanical button 46 to receive input from a user and an LED 48 to provide feedback to the user. Thus, the user might be provided with a set of written instructions to place the training device 44 in training mode (e.g., "Press and hold the button for 3 seconds") and enter the desired information (e.g., "Press the button once each for entry to the grassy area, onset of waste elimination and completion of waste elimination"). The user's compliance with such instructions may be confirmed through illumination of the LED 48.

FIG. 3B shows a training device 50 that may also include personal digital assistant (PDA), wireless telephone, camera, media player and other functionality. In the illustrated example, the training device 50 has a keypad 52 and a microphone 54 to collect information from the user, and a speaker 56 and an LCD 58 to present information and/or feedback to the user. In yet another example, FIG. 3C demonstrates that a training device 60 can include a touch-screen 62 and/or a simplified button interface 64. Each of the training devices 44, 50, 60 may include the components and functionality described for the training device 32 (FIG. 2) and/or the training device 24 (FIG. 1), already discussed.

Figures 4C, 4D:

FIGS. 4A-4F illustrate an approach to implementing the user interface of the training device. In particular, FIG. 4A shows a welcome screen 64 in which the user is given the opportunity to provide a mode selection input. As already noted, the user interface could alternatively use an electromechanical button, microphone, keypad, touchscreen, etc., to obtain inputs from the user. In the illustrated example, the user may select a training mode or an operation mode. The training mode can enable the animal monitoring system 22 (FIG. 1) to be programmed with information that might be useful in detecting elimination events. The operation mode, on the other hand, could involve providing the animal monitoring system 22 (FIG. 1) with the necessary triggering and communication support to notify an irrigation system of one or more elimination events. In the illustrated example, the welcome screen 64 is displayed on a touch-screen of a training device such as the touch-screen 62 of the device 60 (FIG. 3C), already discussed.

Turning now to FIG. 4B, a training mode screen 66 is shown that may be displayed if the user enters the training mode selection input on the previous screen by touching the "Training" box. In the illustrated example, the user may either select the preexisting animal "Maxine" or enter a name for a new animal via a keyboard image that can be displayed if "Enter new pet" is selected. Thus, the illustrated approach may be used to establish profiles for domesticated animals such as pets, wherein the user may enter any desired pet name as an animal identifier input. The profile may include customized settings and waste elimination behaviors. Profiles may also be established for types or species of non-domesticated animals such as deer or ducks on a golf course.

FIG. 4C demonstrates that a learning screen 68 may give the user the option of having the system learn the animal's waste elimination behavior or entering the appropriate information directly. If the "Learn" selection is made, illustrated FIG. 4D provides for a timing initiation screen 70 that enables the user to indicate the moment in which the animal gains access to the grassy area. In this regard, one approach for implementing the monitoring system may be to leverage the fact that that pets typically eliminate when they are initially let outside. Thus, a monitoring period $P_M$ can be established to define the amount of time (say, 5 minutes) after the pet enters the grassy area during which the pet's motion will be monitored. By enabling the user to select the "Grass entry" input 71 while actually observing the pet, a timer can be started to determine the appropriate amount of time for $P_M$ for the animal in question. Alternatively, a sensor such as the proximity sensor 42 (FIG. 2) can be used to start the timer. The timer may reside in the training device, pet monitoring system, or elsewhere in the irrigation architecture.

Turning now to FIG. 4E, another learning screen 72 illustrates that the user may be prompted to indicate when the elimination event has begun by pressing the "Start" box 73, which may function as a waste elimination onset input. This action can mark the ending time for determining the monitoring period. Because the animal may travel out of the initial viewing range of the individual operating the training device, the training device may be constructed as a wireless device that can be carried with the individual while following the animal. Selecting the "Start" input may also cause the system to model the animal's movement during a period in which the animal is known to be urinating or defecating. For example, it has also been determined that certain animals may not move while urinating or defecating. Thus, selecting the "Start" box may also provide a starting point for an idleness period $P_I$, which can define the amount of time for which the pet must be stationary before a pet waste elimination event may be inferred. If the animal moves slightly during waste elimination, the training device may enable the user to set an idleness threshold that defines a motion baseline for determining animal idleness. In the illustrated example, the user is prompted with a slider bar to indicate how much the animal moves during waste elimination.

Another approach may be to take into consideration biological readings or the posture of the animal (using a harness with tilt sensors, for example) during the monitoring period $P_M$. For example, it has also been determined that female animals may squat when urinating and male animals may hike a hind leg when urinating, or that either gender may tilt their body at a certain angle when defecating. Simply put, each of these postures may correspond to a urination signature or defecation signature that can be modeled and used to detect pet waste elimination events. Other behavioral characteristics and/or observations may also be used as a basis to detect pet waste elimination events. Indeed, if the training device has camera functionality, a video or image of the animal may be taken during waste elimination for further posture analysis.

The illustrated user interface also includes "Stop" option 75, which may function as a waste elimination completion input, to indicate the moment in which the animal has completed the waste elimination activity. If the user indicates a desire to enter the behavioral information directly by selecting the "Enter" option (FIG. 4C), FIG. 4F demonstrates in entry screen 74 that the user may alternatively be given the opportunity to simply enter the monitoring period, idleness period, idleness threshold, or any other parameter of interest, via inputs 77.

Returning now to FIG. 2, the illustrated training device 32 also includes a back end module 76 with a microprocessor (uP) 78, memory 80, irrigation controller interface 82 and communication module 84. In the illustrated example, the microprocessor 78, which could be a baseband or application processor of a wireless handset, or an embedded microcontroller, includes and/or executes a training module 86 to determine the monitoring period, the idleness period and the idleness threshold based on the plurality of inputs obtained from the front end module 34. The training module 86 may also generate a programming command that instructs the monitoring system to store the determined parameters. Portions or the entire training module 86 may alternatively be implemented in the animal monitoring system 22 (FIG. 1). The microprocessor 78 may also implement one or more aspects of the user interface 36, already discussed.

The communication module 84 may transmit the programming command, the monitoring period, the idleness period and the idleness threshold to the animal monitoring system 22 (FIG. 1). The communication module 84 can communicate with the animal monitoring system 22 (FIG. 1) over a wired or wireless link. For example, the communication module 84 may use a wide variety of wireless communication techniques such as WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), spread spectrum (e.g., 900 MHz) and other radio frequency (RF) telephony techniques, particularly if the monitoring system is an animal-mounted monitoring system. The communication module 84 may also use a wired connection such as an RS-232 (Electronic Industries Alliance/EIA), Ethernet (e.g., IEEE 802.3-2005, LAN/MAN CSMA/CD Access Method), power line communication (e.g., X10, IEEE P1675), or USB (e.g., Universal Serial Bus 2.0 Specification) connection, particularly if the monitoring system is a perimeter-based monitoring system.

The illustrated training module 86 includes timing logic to facilitate the appropriate parameter determinations. For example, the timing logic may be used to calculate the monitoring period based on the grass entry input and the waste elimination onset input, and to calculate the idleness period based on the waste elimination onset input and the waste elimination completion input.

Figure 5:
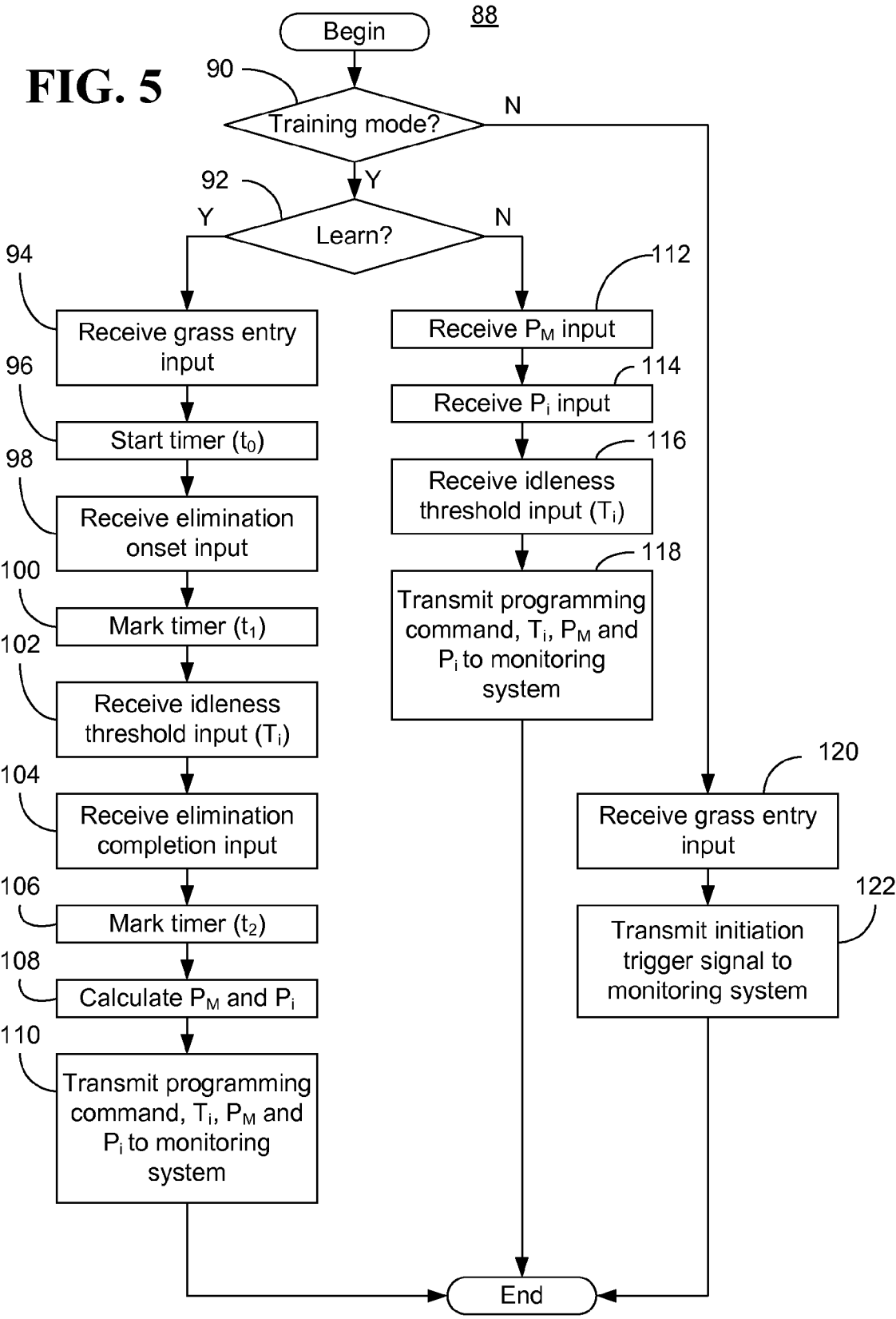
FIG. 5 is a flowchart of an example of a method of operating a training device according to an embodiment of the present invention.

FIG. 5 shows a method 88 of operating a training device in which remote training of an animal monitoring system can be implemented. The method 88 may generally be implemented in executable software as a set of logic instructions stored in a machine- or computer-readable medium of a memory 80 (FIG. 2) such as RAM, ROM, PROM, flash memory, etc., in fixed-functionality hardware of a training device using circuit technology such as ASIC, CMOS, TTL technology, or any combination thereof. In one example, the method 88 can be implemented as software application that is downloadable over an Internet connection to a web-enabled device that has PDA, wireless telephone, camera and/or media player functionality.

In particular, processing block 90 may provide for determining whether a training mode has been selected based on a training mode selection input. If so, illustrated block 92 provides for determining whether a learning option has been selected. If the learning option has been selected, a grass entry input may be received at block 94 and a timer may be started and/or set to time $t_0$ at block 96. Alternatively, the grass entry input may be forwarded, along with a training command, to the animal management system for processing. In such a case, block 96 might be bypassed, wherein the training command can instruct the monitoring system to calculate the appropriate parameters based on the inputs provided. Illustrated block 98 provides for receiving a waste elimination onset input, where the timer can be marked at time $t_1$ in block 100 in response to receiving the waste elimination onset input. The marking process could involve latching the value of the timer into a register or memory location for subsequent retrieval. Again, the waste elimination onset input may alternatively be transmitted to the animal monitoring system for processing and the timing functionality may be bypassed at the training device. An idleness threshold ($T_I$) input can be received at block 102. As already noted, the idleness threshold input could be entered via a slider bar (FIGS. 4E, 4F) of a user interface, or any other suitable approach, and may enhance system accuracy. Illustrated block 104 provides for receiving a waste elimination completion input, wherein the timer can be marked at time $t_2$ at block 106. The waste elimination completion input may alternatively be forwarded to the monitoring system for processing and calculation of the appropriate operating parameters.

Illustrated block 108 provides for calculating the monitoring period and the idleness period based on the inputs received. For example, the following equations might be used, $$P_M=1.5*(t_1-t_0), \quad \text{Equation 1}$$

$$P_i=0.8*(t_2-t_1), \quad \text{Equation 2}$$

where $t_0$ is the grass entry time, $t_1$ is the waste elimination onset time, and $t_2$ is the waste elimination completion time. A scaling value or weight such as 1.5 may be used for $P_M$ to account for potential delays in waste elimination onset time, and a scaling value such as 0.8 may be used for $P_i$ to account for potentially premature waste elimination completion times. Other scaling values may be used without parting from the spirit and scope of the embodiments described herein. The scaling values may also be selected based on other considerations such as the species, breed, and weight of the animal. As already noted, the use of profiles can facilitate such flexibility in the training process.

A programming command, the idleness threshold, the monitoring period and the idleness period may be transmitted to the animal monitoring system at block 110. The programming command can instruct the monitoring system to store the idleness threshold, monitoring period and idleness period to memory for subsequent use during standard operation mode. As already noted, the transmission could be over a wireless or wired link. In addition, the information may be transmitted directly to the monitoring system or via an intermediate component such as the irrigation controller.

If the learning option is not selected at block 92, the training device can permit the user to enter the desired waste elimination behavior parameters. Thus, illustrated block 112 provides for receiving a monitoring period input and block 114 provides for receiving an idleness period input. An idleness threshold input may be received at block 116, and illustrated block 118 provides for transmitting the programming command, idleness threshold, monitoring period and idleness period to the animal monitoring system.

If the training mode input is not provided at block 90, illustrated method 88 also provides for running the training device in operation mode. In such a case, a grass entry input may be received at block 120 and an initiation trigger signal (ITS) may be transmitted to the animal monitoring system at block 122. The initiation trigger signal can instruct the monitoring system to begin tracking the animal's movement in order to detect an elimination event.

Figure 6:
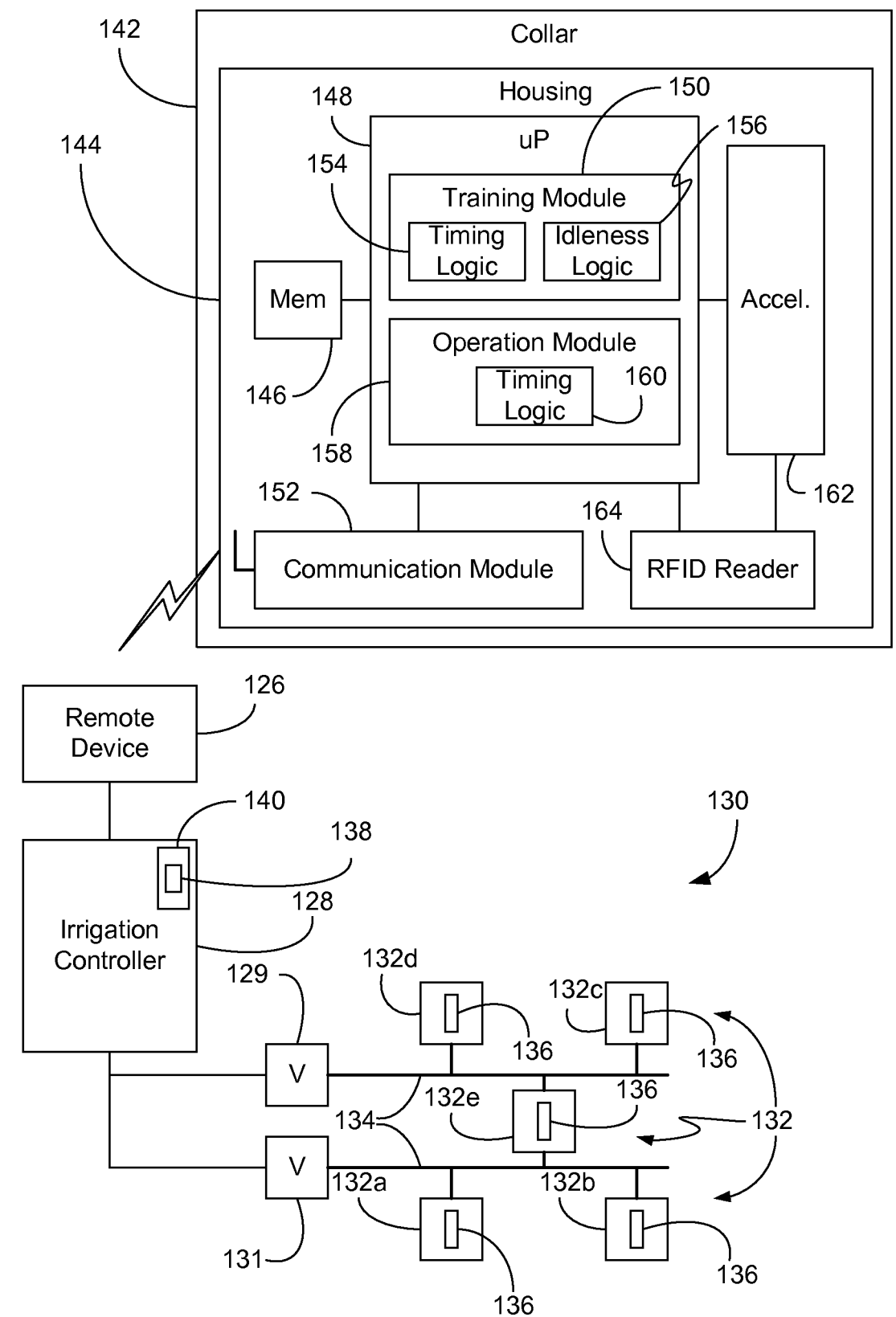
FIG. 6 is a block diagram of an example of a monitoring system according to an embodiment of the present invention.

Turning now to FIG. 6, an animal monitoring system 124 is shown in greater detail. The illustrated monitoring system 124, which may be readily substituted for monitoring system 22 (FIG. 1), already discussed, could be mounted to an animal such as a household pet, wherein the monitoring system 124 can communicate wirelessly with a remote device 126. The remote device 126, which may include the functionality of the training device 24 (FIG. 1) and/or training device 32 (FIG. 2), already discussed, can communicate with an irrigation controller 128 that controls a water distribution system 130. In particular, the illustrated irrigation controller 128 includes a plurality of valves 129, 131. The water distribution system 130 may include a plurality of sprinkler heads 132 (132a-e) and a conduit network 134 coupled to the valves 129, 131, and the sprinkler heads 132. The valves 129, 131 may be incorporated into or separate from the controller 128, depending upon the circumstances.

In addition, the conduit network 134 may be made up of one or more underground conduits or above ground hoses. The illustrated sprinkler heads 132 are equipped with RFID tags 136 to uniquely identify the corresponding sprinkler head 132 to the irrigation system. In one example, each RFID tag 136 may be registered with the controller 128 prior to, during, or after installation or placement of the sprinkler heads 132. When the sprinkler heads 132 are assigned to respective zones or valves, the associated RFIDs may also be included in the process. The registration information, as well as irrigation settings such as schedule 138, may be stored to memory 140 such as RAM, ROM, PROM, flash memory, etc. of controller 128. The registration information and settings may also be stored to memory 80 (FIG. 2) of the remote device 126. The controller 128 may also modify the schedule 138 based on data from other sensors such as rain sensors or solar panels. For example, in operation mode the controller 128 could cancel any recent waste elimination-initiated schedule adjustments in response to detecting rainfall. In another example, if both a waste elimination and heavy sunlight are detected, the controller 128 may schedule water delivery sooner rather than later in order to minimize the likelihood of potential burn spots.

The illustrated monitoring system 124 includes a coupling device such as a harness, bracelet, or collar 142 attached to a housing 144 that includes components capable of training the monitoring system 124 to detect elimination events associated with animals. In the illustrated example, the monitoring system 124 is able to accept raw inputs forwarded from the remote device 126, and calculate the appropriate parameters for detecting elimination events. In particular, the housing 144 may include a memory 146 coupled to a microprocessor (uP) 148. The microprocessor may implement a training module 150 that includes timing logic 154 and idleness logic 156, and an operation module 158 that includes timing logic 160. The housing 144 may also include a communication module 152 that is capable of receiving training data from the remote device 126, wherein the training module 150 can store a monitoring period and an idleness period to the memory 146 based on the training data. As already noted, the monitoring period may define a period of time to monitor an animal for an onset of an elimination event and the idleness period may define a period of time for the elimination event.

The housing 144 may also include an accelerometer 162 and an RFID reader 164. The idleness logic 156 can use data output from the accelerometer to calculate an idleness threshold that defines a motion baseline for determining animal idleness, wherein the training module 150 may store the idleness threshold to the memory 146 in response to the training command. Data output from the accelerometer 162 may also be used by the operation module 158 during operation mode. For example, the illustrated operation module 158 starts the monitoring period in response to an initiation trigger signal from the remote device 126 and increments an idleness counter if the accelerometer 162 indicates that a motion of the monitoring system 124 is below the idleness threshold. The operation module 158 may also increment a monitoring counter until the monitoring period expires. The RFID reader 164 may identify one or more nearby sprinkler heads if the idleness counter reaches a threshold corresponding to the idleness period. The identity of the nearby sprinkler heads may be transmitted to the irrigation system, which can adjust its schedule to deliver water only to areas having localized regions of high nitrogen concentration.

Figure 7:
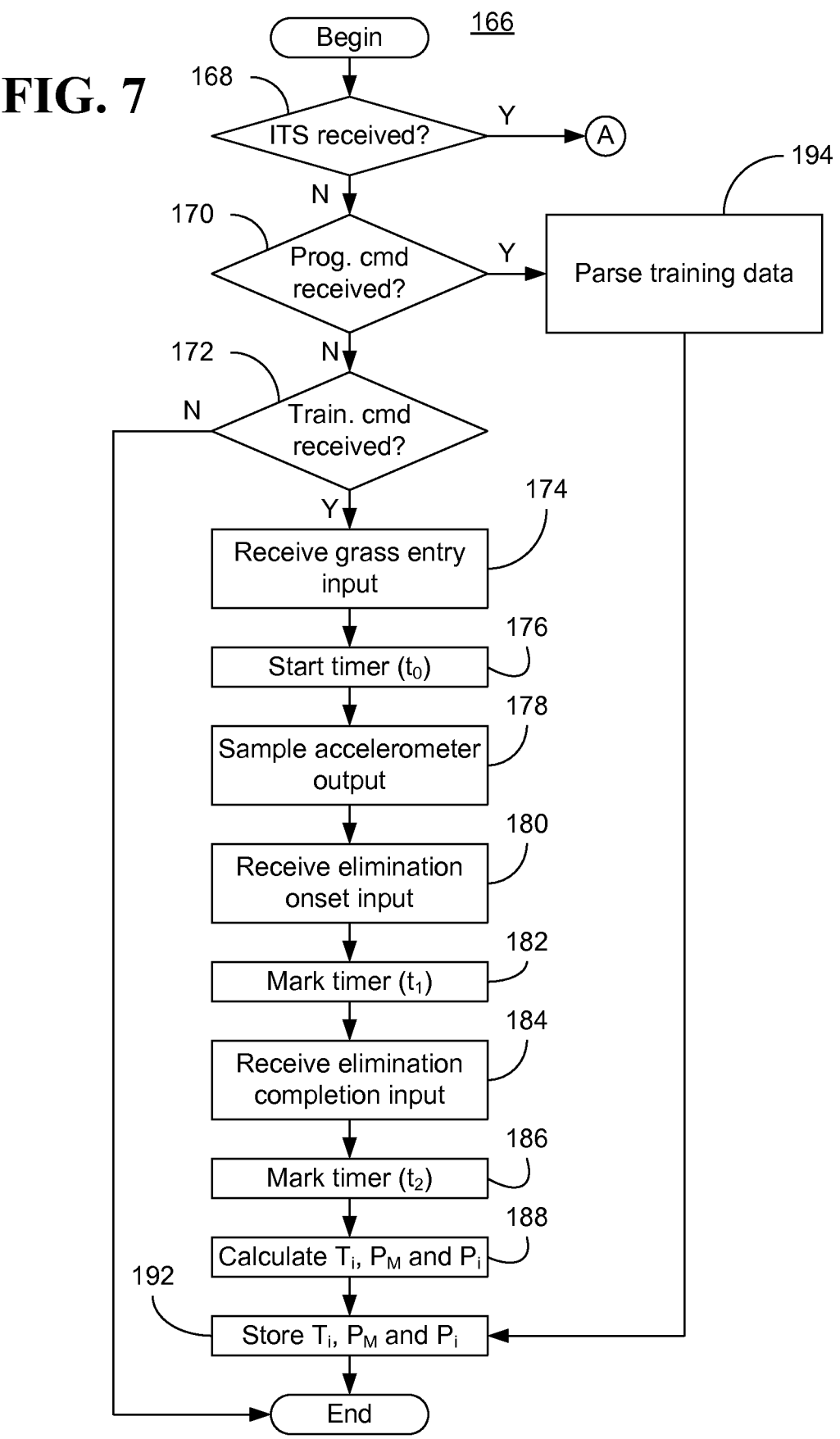
FIG. 7 is a flowchart of an example of a method of operating a monitoring system according to an embodiment of the present invention.

Turning now to FIG. 7, a method 166 of operating a monitoring system is shown. The method 166 may generally be implemented in executable software as a set of logic instructions stored in a machine- or computer-readable medium of a memory 146 (FIG. 6) such as RAM, ROM, PROM, flash memory, etc., in fixed-functionality hardware of a monitoring system using circuit technology such as ASIC, CMOS, TTL technology, or any combination thereof. Illustrated block 168 provides for determining whether an initiation trigger signal has been received. If not, a determination can be made at block 170 as to whether a programming command has been received. If no programming command has been received, illustrated block 172 provides for determining whether a training command has been received. If so, the monitoring system can train itself locally based on the raw inputs received from the remote training device. Accordingly, a grass entry input may be received at block 174, and illustrated block 176 provides for initiating starting and/or setting a timer to time $t_o$. Illustrated block 178 provides for sampling an accelerometer output. Sampling the accelerometer output may enable the animal's movement and behavior to be modeled, and the sampling may continue until the waste elimination completion input has been received, or longer. The sampling rate can be set at any appropriate value based on a number of considerations such as the frequency of change in the animal's movement, the output capabilities of the accelerometer, the processing capabilities of the microprocessor, power requirements, and so on.

A waste elimination onset input may be received at block 180, and the timer can be marked at time $t_1$ at block 182 in response to receiving the waste elimination onset input. The marking process could involve latching the value of the timer into a register or memory location for subsequent retrieval. Illustrated block 184 provides for receiving a waste elimination completion input and illustrated block 186 provides for marking the timer at time $t_2$. The idleness threshold, monitoring period and idleness period may be calculated at block 188. The calculations for the monitoring period and idleness period may be similar to the calculations already described with respect to Equations 1 and 2.

Figure 8A:
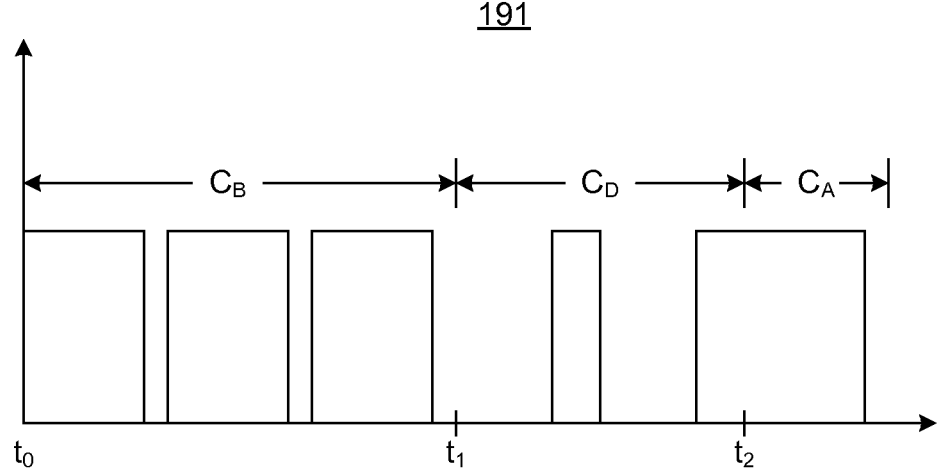
FIG. 8A is a plot of an example of an accelerometer output according to an embodiment of the present invention.

FIG. 8A shows an example of a plot of an accelerometer output 191. The illustrated plot 191 could be a digital pulse width modulation (PWM) signal obtained from the output of accelerometer 162 (FIG. 6), already discussed. The PWM signal could represent the amount of acceleration along or about a single axis or multiple axes, wherein each axis in a multiple axis arrangement may be OR'ed together to achieve heightened sensitivity. Thus, a heavy duty cycle may generally correspond to more motion with regard to the animal, and a light duty cycle may generally correspond to less motion. An example of the duty cycle before waste elimination ($C_B$) can be shown by the period between times $t_0$ and $t_1$, the duty cycle during waste elimination ($C_D$) can be shown by the period between times $t_1$ and $t_2$, and the duty cycle after waste elimination ($C_A$) can be shown by the period after time $t_2$. One approach to calculating the idleness threshold Ti can be expressed by the equation, $$T_i=1.2*C_D, \qquad \text{Equation 3}$$

where 1.2 is a scaling value that may be used to account for potentially larger than measured duty cycles during waste elimination. Other scaling values may be used without parting from the spirit and scope of the embodiments described herein. If $C_D$ is zero, $T_i$ may be set to some nominal value slightly above zero.

Figure 8B:
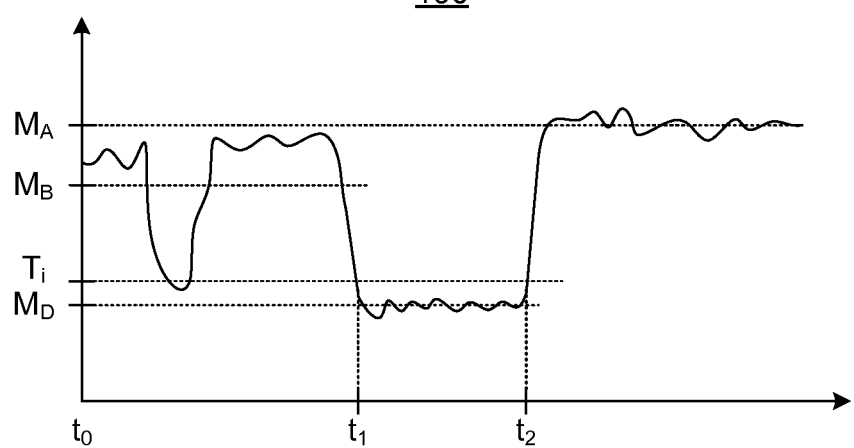
FIG. 8B is a plot of an example of a motion curve according to an embodiment of the present invention.

Turning now to FIG. 8B, a plot of a velocity or motion curve 190 is shown. The illustrated motion curve 190, which generally indicates the animal's movement over time, may be derived from the accelerator output or obtained from a perimeter-based motion detection system. An example of the animal's average movement before waste elimination ($M_B$) may be shown by the period between times $t_0$ and $t_1$, an example of the animal's average movement during waste elimination ($M_D$) may be shown by the period between times $t_1$ and $t_2$, and an example of the animal's average movement after waste elimination ($M_A$) may be shown by the period after time $t_2$. One approach to calculating the idleness threshold $T_i$ can be shown by the equation, $$T_i=1.2*M_D, \qquad \text{Equation 4}$$

where 1.2 is a scaling value that may be used to account for potentially above average movement of the animal during waste elimination. Other scaling values may be used without parting from the spirit and scope of the embodiments described herein. If $M_D$ is zero, $T_i$ may be set to some nominal value slightly above zero.

In the illustrated example, the movement of the animal drops briefly below the idleness threshold, but a false positive would not occur for the same movement during operation because the period of time that the curve drops below the idleness threshold does not exceed the idleness period, which may be a scaled value of $t_2-t_1$, as already discussed with respect to Equation 2.

Returning now to FIG. 7, illustrated block 192 provides for storing the idleness threshold, monitoring period and idleness period to memory. Other calculated parameters may also be stored. If it is determined at block 170 that a programming command has been received, the training data may be parsed at block 194 in order to identify specific waste elimination behavior parameters and other related data. For example, if the idleness threshold, monitoring period and idleness period were determined at the training device, the illustrated parsing process may involve identifying those parameters.

Figure 9:
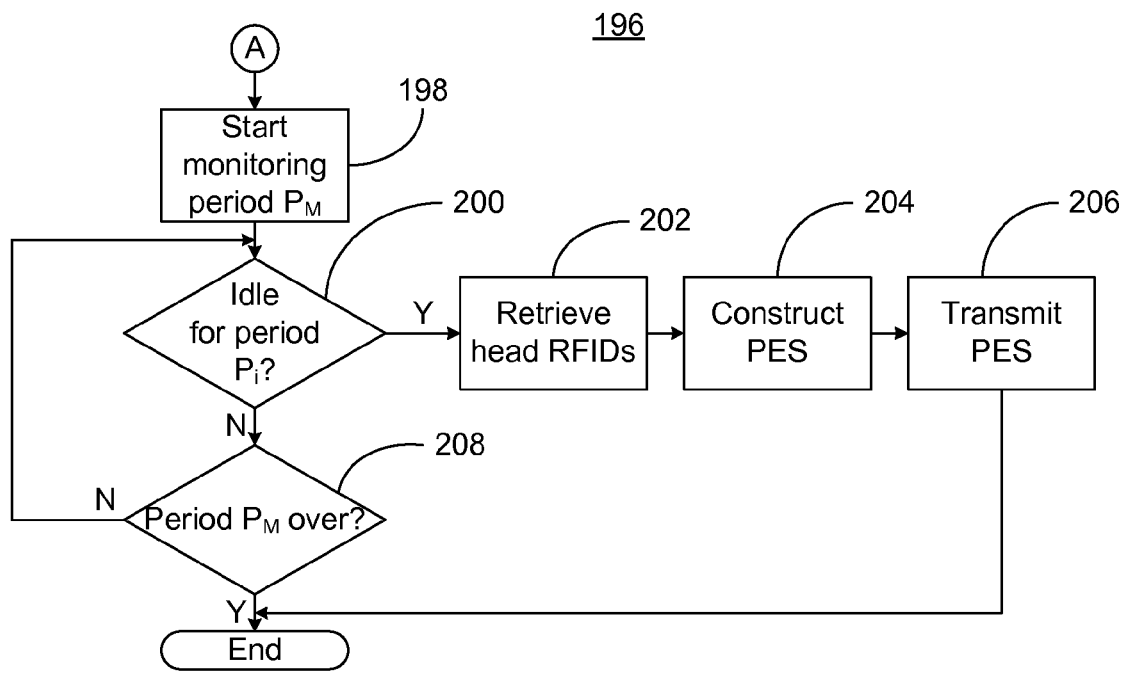
FIG. 9 is a flowchart of an example of a method of generating a pet waste elimination signal according to an embodiment of the present invention.

FIG. 9 illustrates that if it is determined at block 168 (FIG. 7) that an initiation trigger signal has been received, the monitoring system may generate a pet waste elimination signal upon detection of an elimination event. The method 196 may generally be implemented in executable software as a set of logic instructions stored in a machine- or computer-readable medium of a monitoring system memory 146 (FIG. 6) such as RAM, ROM, PROM, flash memory, etc., in fixed-functionality hardware of an animal monitoring system using circuit technology such as ASIC, CMOS or TTL technology, or any variation thereof In particular, a monitoring period $P_M$ is started at illustrated block 198 and block 200 may provide for determining whether an idleness period $P_i$ has expired during the monitoring period $P_M$. As already noted, the idleness determination can take into consideration the idleness threshold T. If the idleness period has expired, nearby sprinkler head RFIDs may be retrieved and stored at block 202, and a pet waste elimination signal (PES) or other pet waste elimination notification may be constructed at block 204. In this regard, the pet waste elimination signal can be constructed into a simple packet containing an indication of the nearby sprinkler heads (e.g., head_1, head_2), an indication of the type of waste elimination event (e.g., "1" for urination, "0" for defecation), and a timestamp indicating the time and/or date of the elimination event. The PES may be sent to the irrigation controller or training device at block 206 for processing. The PES may also be stored locally for later transmission, perhaps, when the pet re-enters the premises. Illustrated block 208 provides for determining whether the monitoring period $P_M$ has expired if the idleness period $P_i$ has not expired. If not, the idleness check at block 200 may be repeated as needed.

Figure 10:
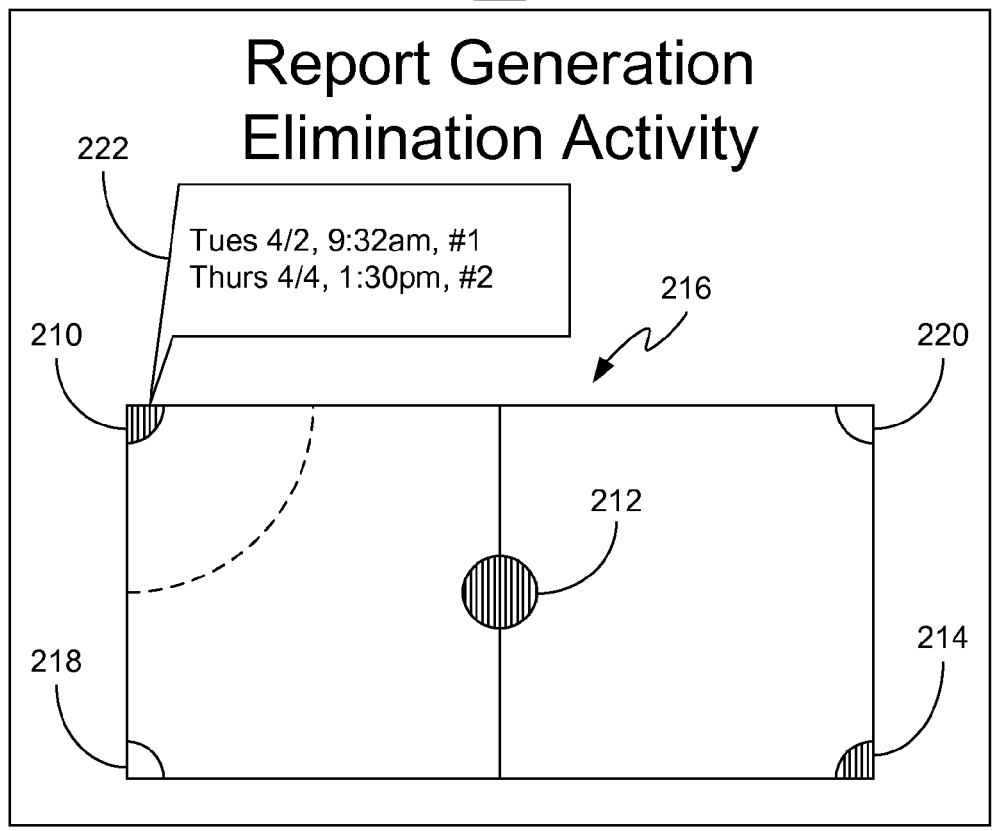
FIG. 10 is a screen shot of an example of a report generation interface according to an embodiment of the present invention.

Turning now to FIG. 10, an example of a waste elimination activity report generation interface is shown at report screen 208. In particular, the software and/or hardware for generating the screen 208 may be incorporated into a training device such as the training devices described herein.

In the illustrated example, a grassy area 216 is shown as being partitioned into two zones serviced by sprinkler heads 210, 212, 214, 218, 220. The cross-shading may be used to indicate that one or more elimination events have taken place near sprinkler heads 210, 212, and 214. In the illustrated example, the user may touch any of the sprinkler heads to retrieve a report detailing the waste elimination activity for the selected head. Thus, the user might select sprinkler head 210 to retrieve a report 222 indicating that a urination event occurred on Tuesday, April 2, at 9:32 am, and a defecation event occurred on Thursday, April 4, at 1:30 pm. Such a report could be used by the irrigation controller in scheduling water delivery. The report, which may be printed, emailed, or otherwise downloaded to a desired location, could also be useful to "pooper scooper" services that provide for periodic feces removal.

Figure 11:
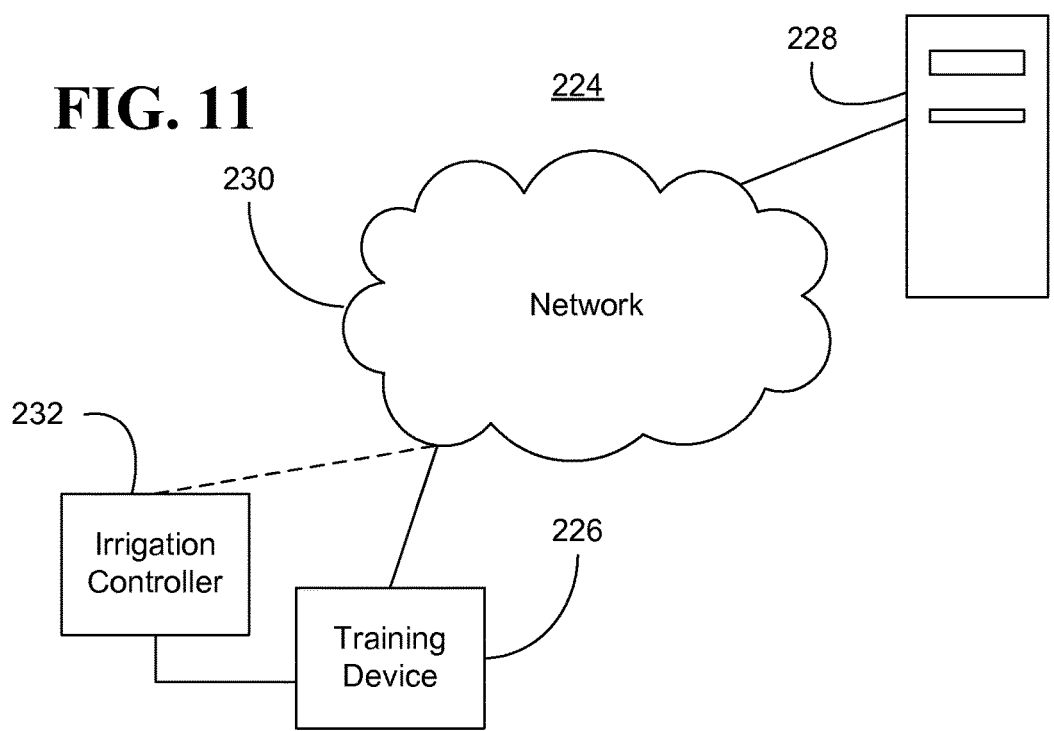
FIG. 11 is a block diagram of an example of a networking architecture according to an embodiment of the present invention.

FIG. 11 shows a networking architecture 224 in which a training device 226 has a connection to a server 228 via a network 230 such as the Internet, and a connection to an irrigation controller 232, which may also have an Internet connection. In the illustrated example, the training device 226 is enable to download application software such as software structured to provide the user interface already discussed, and perform the method 88 (FIG. 5), also already discussed, from the server 228. The training device 226 may also transmit video or images of monitored animals, or reports such as the report 222 (FIG. 11) over the network 230 to a third party or other destination.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A training device comprising:
   a front end module including a user interface to receive a plurality of inputs from a user, wherein the plurality of inputs define an observed set of animal waste elimination behaviors; and
   a back end module to use a monitoring period and an idleness period to train an animal monitoring system to monitor an animal based on the plurality of inputs, the back end module including a training module to calculate the monitoring period, the idleness period and an idleness threshold.

2. The device of claim 1, wherein the plurality of inputs are to include a training mode selection input and a plurality of waste elimination timing inputs.

3. The device of claim 2, wherein the plurality of waste elimination timing inputs are to include at least one of a grass entry input that corresponds to an animal entering a grassy area, an idleness threshold input that defines a motion baseline for determining animal idleness, and an animal identifier input.

4. The device of claim 3, wherein the device is to establish a profile based on the animal identifier input.

5. The device of claim 2, wherein the user interface includes at least one of a button, a keypad and a touchscreen.

6. The device of claim 2, wherein the user interface includes an output component to provide information to the user, the output component having at least one of a liquid crystal display (LCD), a light emitting diode (LED) and a speaker.

7. The device of claim 1, wherein the front end module further includes a sensor to receive a grass entry input that corresponds to an animal entering a grassy area.

8. The device of claim 1, wherein the training module is to further determine the idleness threshold based on the plurality of inputs and the back end module includes:
   a communication module to transmit a programming command, the monitoring period, the idleness period and the idleness threshold to the animal monitoring system.

9. The device of claim 8, wherein the training module includes timing logic to calculate the monitoring period based on a grass entry input received from the user interface and a waste elimination onset input received from the user interface, and to calculate the idleness period based on the waste elimination onset input and a waste elimination completion input received from the user interface.

10. The device of claim 1, wherein the back end module includes a communication module to transmit a training command and the plurality of inputs to the animal monitoring system.

11. The device of claim 1, wherein the front end module is to receive an operation mode selection input from the user interface and a grass entry input from the user interface, wherein the grass entry input corresponds to an animal entering a grassy area, and the back end module is to transmit an initiation trigger signal to the animal monitoring system based on the operation mode selection input and the grass entry input.

12. The device of claim 1, further including an irrigation controller interface.

13. The training device of claim 1, wherein the monitoring period is calculated as a function of a scaling value.

14. The training device of claim 13, wherein the back end module is to select the scaling value based on one or more of a species, a breed or a weight of the animal.

15. The training device of claim 1, wherein the idleness period is calculated as a function of a scaling value.

16. The training device of claim 15, wherein the back end module is to select the scaling value based on one or more of a species, a breed or a weight of the animal.

* * * * *